W. M. FLEMING AND N. E. BRIGHAM.
PUMP.
APPLICATION FILED JAN. 27, 1921.
1,406,178.
Patented Feb. 14, 1922.
2 SHEETS—SHEET 1.
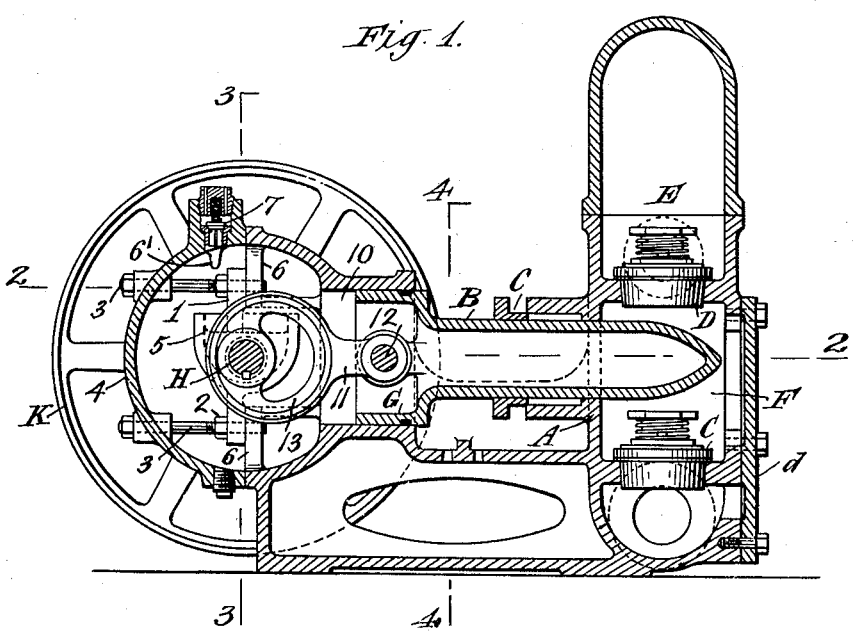
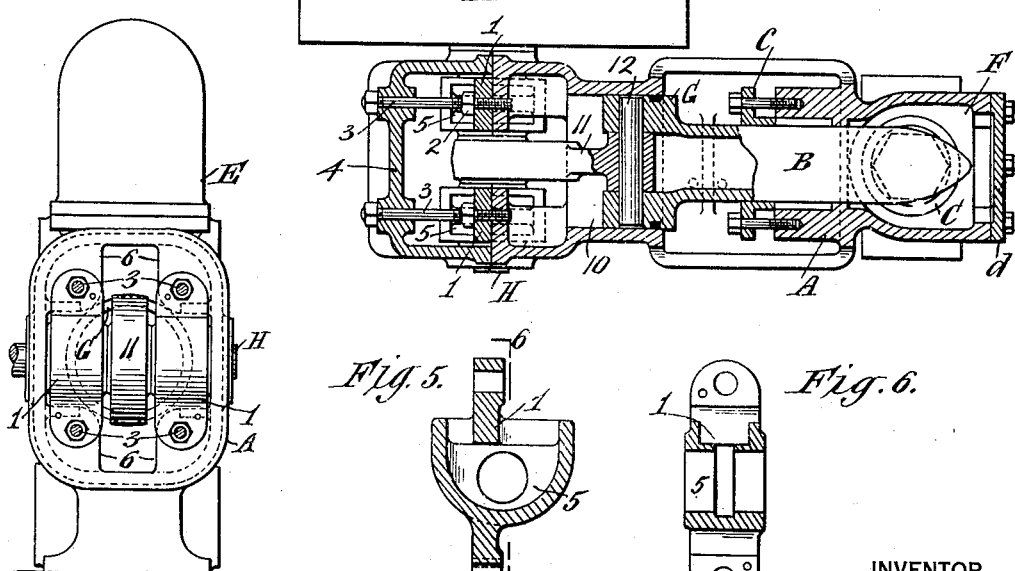
INVENTOR
Wells M. Fleming  Nelson E. Brigham
BY THEIR ATTORNEYS

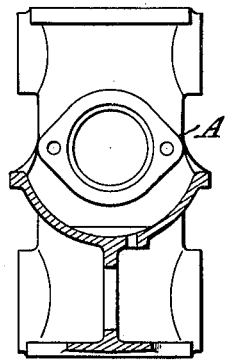
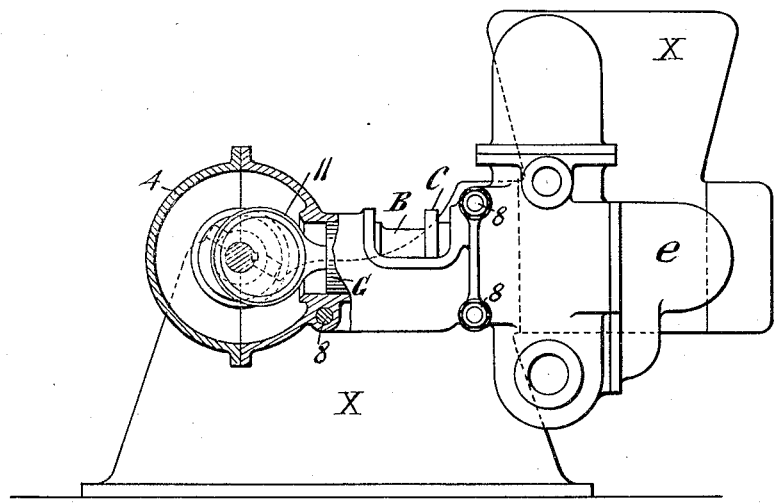

UNITED STATES PATENT OFFICE.

WILLS M. FLEMING, OF HOLYOKE, AND NELSON E. BRIGHAM, OF SOUTH HADLEY FALLS, MASSACHUSETTS, ASSIGNORS TO WORTHINGTON PUMP AND MACHINERY CORPORATION, OF NEW YORK, N. Y., A CORPORATION OF VIRGINIA.

PUMP.

1,406,178.  Specification of Letters Patent.  Patented Feb. 14, 1922.

Application filed January 27, 1921. Serial No. 440,283.

*To all whom it may concern:*

Be it known that we, WILLS M. FLEMING and NELSON E. BRIGHAM, citizens of the United States, residing, respectively, at Holyoke, county of Hampden, and State of Massachusetts, and South Hadley Falls, county of Hampshire, State of Massachusetts, have invented certain new and useful Improvements in Pumps, fully described and represented in the following specification and the accompanying drawings, forming a part of the same.

This invention relates to an improvement in pumps.

It is one object of the present invention to provide a reciprocating pump which shall be strong, durable, and so simple of construction as to enable its manufacture at low cost. We aim, also, to provide a pump, the driving parts of which are so constructed and arranged that the pump may be manufactured as an independent or belt-driven unit, or adapted to be mounted on the frame of an internal combustion engine or the like and operated directly by the engine shaft.

It is a further object of the invention to so construct and locate the driving shaft bearings that they may be mounted on but entirely outside and independent of the pump frame, thus greatly simplifying and expediting boring and machining on the pump frame, as hereinafter set forth. These bearings are used when the pump is a complete unit, but omitted when the pump is mounted on an engine.

It is a still further object of the invention to prevent oil leakage from the shaft or crank casing and secure cooling of the bearings by means located in the shaft or crank casing co-operating with a packed crosshead and its guide, for producing a constant expansion and circulation of cooling air through the shaft or crank casing and along the shaft and crosshead bearing surfaces while the pump is working, such means not only effectually preventing loss of lubricant, but also permitting the pump to be run at high speeds, if desired, with minimum wear and danger of overheating.

In the accompanying drawings forming a part of this specification, a horizontal single-acting pump embodying the invention in its preferred form is shown, and this construction will now be described in detail and the features forming the invention then specifically pointed out in the claims.

In the drawings—

Figure 1 is a vertical central section longitudinally of the pump plunger;

Figure 2 is an irregular section on the line 2—2 of Fig. 1;

Figure 3 is a sectional end elevation on the line 3—3 of Fig. 1;

Figure 4 is a section on the line 4—4 of Fig. 1;

Figure 5 is a vertical section of one of the outside main bearings;

Figure 6 is a section on the line 6—6 of Fig. 5, and

Figure 7 is a side elevation, partly broken away, showing the outside main bearings and supporting flanges removed, with the plunger eccentrically operated directly from an extension of the shaft of an internal combustion engine and mounted thereon so as to form a single unit.

Referring now to the drawings, A indicates generally the cylinder casting, B the pump plunger, C, D the suction and discharge valves, E the discharge air chamber, and F the pulsation chamber formed by an enlargement of the cylinder space. G is the cross-head formed by an enlargement of the pump plunger, suitably packed and working in an open ended guide 10, such crosshead and guide preferably and as shown being of cylindrical form in cross-section. The crosshead G is linked by pin 12 to an eccentric connection 11 on eccentric disk 13 keyed to the driving shaft H driven by belt pulley K. The shaft H is supported by bearings 1 fastened to triangular flanges 6 formed in that half of the split shaft casing which is part of the pump frame, such flanges having an open space between them for the eccentric connection 11, the bearings 1 being securely held in position on the flanges by nuts 2 on the shanks of headed studs 3 extending through and securing in place a removable section 4 of the shaft casing. Oil-retaining pockets 5 are formed on the bearings 1 for catching the oil splashed into the top of the shaft or crank casing and oiling the shaft, which oil drips into such pockets from either the rib 6 or 6', or from the studs 3, depending upon the direction of rotation of the shaft.

The pump plunger B is provided with an outside stuffing box and packing gland c, and the suction and pulsation chambers with a removable cap d, which may or may not embody a suction air chamber as shown at e in Fig. 7, such cap permitting ready access to the suction valve.

The pump may be mounted directly on the frame of an internal combustion engine or the like, and with its eccentric directly mounted on the shaft of such engine as indicated in Fig. 7, with no alteration of the pump frame, the main bearings 1, one of which is located on each side of the shaft casing, being each formed as a complete bearing unit, as shown in Figs. 5 and 6, so that they are entirely outside and independent of the pump frame, thus enabling such bearings to be readily dispensed with when the pump is to be thus connected. In this construction of Fig. 7 the internal combustion engine is indicated generally by the letter X, and the pump frame is secured thereto by bolts 8. The section 4 of the shaft or crank casing of this construction may be secured by outside flanges on such section and the pump frame, bolted together, or in any other suitable manner.

To prevent loss of lubricant by leakage, and to maintain a constant expansion and circulation of cooling air along the crosshead and shaft bearings and in the shaft casing when the pump is running, there preferably is provided an outwardly opening valve 7 in the shaft casing, by the provision of which a partial vacuum will be produced in such casing due to displacement of air therein by the crosshead G on the suction stroke and the formation of a partial vacuum on the outward stroke, which will tend to cause leakage air to enter along the crosshead and the shaft bearings, thereby preventing leakage of oil at these points, while the air expansion in the shaft casing and its constant renewal by cool air leaking into the shaft casing, will produce a cooling effect on the bearings, which aids in running the pump at high speeds.

It will be seen that, by forming the pump frame with the removable section 4 and making the main bearings independent of the pump frame, access is provided at the shaft end of the pump for boring and machining the pump frame and cylinder openings. Thus, in the construction shown, the front and rear ends of the cylinder and all parts of the construction requiring milling, are readily accessible to the milling machine, there being no main bearings to prevent milling the shaft end of the frame. The crosshead guide also may be bored with a full sized bar passing in from the shaft end of the frame and, with three cutters on this bar, the crosshead guide, the stuffing box, and the plunger throat may be machined at one time, which would be impossible with the main bearings cast in with the frame, unless the frame were widened out excessively. The large opening at the shaft end of the frame, with the open crosshead guide, also enables the gland stud holes to be drilled and tapped through from the shaft end of the frame.

It will be understood that the independent bearing feature shown and described is not limited to use with a pump of the type illustrated, but is applicable with other types of pumps, and that the air circulation feature may be used otherwise than in pumps. It will be understood, also, that the construction shown as embodying the invention may be varied while retaining the invention defined by the claims.

What is claimed is:

1. A pump comprising a frame having a pump cylinder and crosshead guide integral therewith, an outside packed pump plunger and crosshead working in said cylinder and guide, a shaft and connection to the crosshead for reciprocating said plunger, and a sectional crank casing having a removable section at the shaft end of the pump in line with the crosshead, whereby the crosshead guide and plunger opening may be machined from the outer end of the pump.

2. A pump comprising a frame having a pump cylinder and crosshead guide integral therewith, an outside packed pump plunger and crosshead working in said cylinder and guide, a shaft and connection to the crosshead for reciprocating said plunger, a sectional crank casing having a removable section at the shaft end of the pump in line with the crosshead, and removable shaft bearings in said casing, whereby the crosshead guide and plunger opening may be machined from the outer end of the pump.

3. A pump comprising a frame having a pump cylinder and crosshead guide integral therewith, an outside packed pump plunger and crosshead working in said cylinder and guide, a shaft and connection to the crosshead for reciprocating said plunger, a sectional crank casing having a removable section at the shaft end of the pump in line with the crosshead, removable shaft bearings in said casing, whereby the crosshead guide and plunger opening may be machined from the outer end of the pump, and a removable cap on the outer end of the pump cylinder.

4. A pump comprising a frame having a pump cylinder and tubular crosshead guide integral therewith, an outside packed pump plunger and cylindrical crosshead working in said cylinder and guide, a shaft and connection to the crosshead for reciprocating said plunger, a sectional crank casing having a removable section at the shaft end of the pump in line with the crosshead, and removable shaft bearings in said casing.

5. A pump comprising a frame having a pump cylinder and crosshead guide integral therewith, an outside packed pump plunger and crosshead working in said cylinder and guide, a shaft and connection to the crosshead for reciprocating said plunger, a sectional crank casing having a removable section at the shaft end of the pump in line with the crosshead, bearing supporting flanges formed on the frame section of said casing, and shaft bearings removably mounted on said flanges.

6. A pump comprising a frame having a pump cylinder, crosshead guide and crank casing section integral therewith, a removable crank casing section, a pump plunger, a shaft and connections for reciprocating said plunger, bearing-supporting flanges on the fixed part of said crank casing, and removable shaft bearings mounted on the outside of said flanges, whereby the shaft may be withdrawn sidewise at the end of the pump.

7. A crank casing having a crosshead working in a tubular guide to force air from the casing, and an air valve on said casing opening outwardly to the atmosphere.

8. A pump comprising a frame having formed therein a cylinder A and integral crosshead guide 10, outside packed plunger B and crosshead G, and shaft connections 11, 13.

9. A pump comprising a frame having formed therein a cylinder A and tubular crosshead guide 10, outside packed plunger B and cylindrical crosshead G, removable bearings 1 in the crank casing, and removable casing section 4.

In testimony whereof, we have hereunto set our hands.

WILLS M. FLEMING.
NELSON E. BRIGHAM.